(12) United States Patent
Rust et al.

(10) Patent No.: US 9,307,747 B2
(45) Date of Patent: Apr. 12, 2016

(54) AVIARY CAGE

(71) Applicant: Rose Acre Farms, Inc., Seymour, IN (US)

(72) Inventors: Marcus D. Rust, Remington, IN (US); Joseph M. Dart, West Lafayette, IN (US)

(73) Assignee: Rose Acre Farms, Inc., Seymour, IN (US)

( * ) Notice: Subject to any disclaimer, the term of this patent is extended or adjusted under 35 U.S.C. 154(b) by 318 days.

(21) Appl. No.: 14/181,379

(22) Filed: Feb. 14, 2014

(65) Prior Publication Data

US 2015/0230432 A1     Aug. 20, 2015

(51) Int. Cl.
*A01K 31/12*     (2006.01)
*A01K 31/22*     (2006.01)

(52) U.S. Cl.
CPC ............... *A01K 31/12* (2013.01); *A01K 31/22* (2013.01); *Y10T 29/49826* (2015.01)

(58) Field of Classification Search
CPC ..... A01K 31/14; A01K 31/16; A01K 31/165; A01K 31/04; A01K 31/002; A01K 31/005; A01K 31/17
USPC .......................... 119/329–344, 428–441, 468
See application file for complete search history.

(56) References Cited

U.S. PATENT DOCUMENTS

| | | | | |
|---|---|---|---|---|
| 1,674,193 A | * | 6/1928 | Charles | A01K 31/16 119/329 |
| 2,096,356 A | * | 10/1937 | Fox | A01K 31/17 119/336 |
| 2,257,734 A | * | 10/1941 | Cornell | A01K 31/17 119/437 |
| 2,565,521 A | | 8/1951 | Ratermann | |
| 3,119,375 A | * | 1/1964 | Ernst | A01K 31/17 119/337 |
| 3,164,129 A | * | 1/1965 | Rigterink | A01K 31/16 119/336 |
| 3,464,389 A | | 9/1969 | Seiderman | |
| 4,011,837 A | | 3/1977 | Ksioszk | |
| 4,023,531 A | | 5/1977 | Thompson | |
| 4,250,837 A | * | 2/1981 | Cocklereece | A01K 31/16 119/336 |
| 4,315,481 A | | 2/1982 | Coile et al. | |
| 4,321,887 A | | 3/1982 | Martin et al. | |

(Continued)

FOREIGN PATENT DOCUMENTS

| | | |
|---|---|---|
| CH | 662244 A5 | 9/1987 |
| DE | 20317631 U1 | 4/2004 |
| EP | 1477057 A1 | 11/2004 |

OTHER PUBLICATIONS

Big Dutchman, NATURA60 & NATURA70 The modern aviaries for barn and free range egg production, Product Brochure, Mar. 2010.

(Continued)

*Primary Examiner* — Richard Price, Jr.
(74) *Attorney, Agent, or Firm* — Ice Miller LLP (57) ABSTRACT

An aviary is provided having a floor and a first aviary cage including a first outside surface enclosing a first inside area. The aviary further comprises a second aviary cage similar to the first aviary cage and including a second outside surface enclosing a second inside area. An aisle extends between the first aviary cage and the second aviary cage. A first perch extends from the first outside surface of the first aviary cage and into the aisle at a first vertical distance from the floor. A second perch extends from the second outside surface of the second aviary cage and into the aisle at a second vertical distance from the floor. The first and second vertical distances from the floor are not equal.

28 Claims, 7 Drawing Sheets

(56) References Cited

U.S. PATENT DOCUMENTS

| | | | | |
|---|---|---|---|---|
| 4,416,219 A | * | 11/1983 | Dill | A01K 31/165 119/337 |
| 4,841,909 A | | 6/1989 | Siciliano | |
| 5,279,254 A | * | 1/1994 | Dowty | A01K 31/165 119/337 |
| 5,662,068 A | | 9/1997 | Childs | |
| 5,666,905 A | | 9/1997 | Mackin et al. | |
| 6,412,439 B1 | | 7/2002 | Otto-Lubker et al. | |
| 6,968,807 B2 | | 11/2005 | Kuhlmann | |
| 7,350,364 B2 | | 4/2008 | Meerpohl | |
| 7,827,938 B2 | | 11/2010 | Kuehlmann | |

OTHER PUBLICATIONS

Agricultural Mfg. & Textiles, Inc., FingerBelt Laced with Fingers, Internet Article, May 15, 2006, Agricultural Mfg., & Textiles, Inc.

Big Dutchman, Egg Production Photos, Internet Article.

Big Dutchman, The modem aviary for layers in floor management, Internet Article, Sep. 12, 2012-Aug. 13, 2013.

Big Dutchman, NATURA70: Flexible, efficient and profitable, Internet Article, Sep. 12, 2012-Aug. 13, 2013.

Big Dutchman, Group laying nest for optimum egg quality, Internet Article, Sep. 12, 2012-Aug. 13, 2013.

Poultry Times.Net, CSES research examines worker health, Internet Newspaper Article, Oct. 4, 2013.

Potters Poultry International, Aviary, Product Brochure.

Vencomatic Group, Bolegg Terrace, Product Brochure.

"Het etagesysteem voor leghennen; Ontwikkeling en toetsing van een volieresysteem voor leghennen" (1980-1987), Dec. 1, 1987, XP055195185, Netherlands.

"Tiered Floor System for Laying Hens-development and testing of a henhouse system for laying hens" (1980-1987), Dec. 1, 1987 XP055195185, Netherlands, English translation.

(EP141911765.8) European Patent Office, European Search Report, Jul. 1, 2015.

(EP141911765.8) European Patent Office, Written Opinion of the European Search Report, Jul. 1, 2015.

\* cited by examiner

AVIARY CAGE

TECHNICAL FIELD OF THE DISCLOSED EMBODIMENTS

The embodiments herein generally relate to aviary cages and, more particularly, to aviary cages having perches positioned thereon.

BACKGROUND OF THE DISCLOSED EMBODIMENTS

Aviaries are frequently used to house hens for egg production and include aviary cages therein. Generally, the aviary cage includes nesting areas where eggs are laid. The eggs are then carried from the nesting area to a collection area by an egg conveyor that is positioned adjacent the nesting area. Recently, the need to provide the hens with an area to walk around and peck and scratch has increased dramatically as more farms are producing "cage free" product. "Cage free" indicates that the hens are able to move through a much larger space than is available in conventional battery cages.

Unfortunately, providing a cage free environment requires a substantial amount of space within the aviary. In particular, a cage free environment is defined by the amount of cubic inches of space within the aviary that is available to each hen. Cage free environments therefore frequently house fewer birds than conventional aviary battery cage houses with similar footprints. For example, some aviaries have a reduced number of cage towers to accommodate the cubic inch requirements for a cage free environment. Limiting the number of hens that may be housed in an aviary results in lost profits, increased labor requirements, increased maintenance requirements, and/or increased spending for additional cages.

SUMMARY OF THE DISCLOSED EMBODIMENTS

In one embodiment, an aviary is provided having a floor and a first aviary cage including a first outside surface enclosing a first inside area. The aviary further comprises a second aviary cage similar to the first aviary cage and including a second outside surface enclosing a second inside area. An aisle extends between the first aviary cage and the second aviary cage. A first perch extends from the first outside surface of the first aviary cage and into the aisle at a first vertical distance from the floor. A second perch extends from the second outside surface of the second aviary cage and into the aisle at a second vertical distance from the floor. The first and second vertical distances from the floor are not equal.

In one embodiment, an aviary is provided having a floor and a first aviary cage including a first outside surface enclosing a first inside area. The aviary further comprises a second aviary cage similar to the first aviary cage and including a second outside surface enclosing a second inside area. An aisle extends between the first aviary cage and the second aviary cage. A first perch extends from the first outside surface of the first aviary cage and into the aisle at a first vertical distance from the floor. A second perch extends from the second outside surface of the second aviary cage and into the aisle at a second vertical distance from the floor. The first and second vertical distances from the floor are not equal and define a third vertical distance that enables an animal to hop between the first perch and the second perch.

In one embodiment, a method of constructing an aviary is provided. The method includes positioning a first aviary cage including a first outside surface enclosing a first inside area adjacent to a second aviary cage similar to the first aviary cage and including a second outside surface enclosing a second inside area, wherein both the first aviary cage and the second aviary cage are positioned over a floor. The method also includes extending an aisle between the first aviary cage and the second aviary cage. The method also includes extending a first perch from the first outside surface of the first aviary cage and into the aisle at a first vertical distance from the floor. The method also includes extending a second perch from the second outside surface of the second aviary cage and into the aisle at a second vertical distance from the floor, wherein the first and second distances are not equal. The method also includes positioning the first and second vertical distances to define a third vertical distance that enables an animal to hop between the first perch and the second perch.

Other embodiments are disclosed.

BRIEF DESCRIPTION OF THE DRAWINGS

The embodiments described herein and other features, advantages, and disclosures contained herein, and the manner of attaining them, will become apparent and the present disclosure will be better understood by reference to the following description of various exemplary embodiments of the present disclosure taken in conjunction with the accompanying drawing, wherein.

DETAILED DESCRIPTION OF THE DISCLOSED EMBODIMENTS

The features and advantages of this disclosure, and the manner of attaining them, will be more apparent and better understood by reference to the following descriptions of the disclosed methods and systems, taken in conjunction with the accompanying drawings. The components in the figures are not necessarily to scale, emphasis instead being placed upon illustrating the principles of the disclosure. Moreover, in the figures like-referenced numerals designate corresponding parts throughout the different views, but not all reference numerals are shown in each of the figures.

For the purposes of promoting an understanding of the principles of the present disclosure, reference will now be made to the embodiments illustrated in the drawings, and specific language will be used to describe the same. It will nevertheless be understood that no limitation of the scope of this disclosure is intended thereby.

Figure 1:
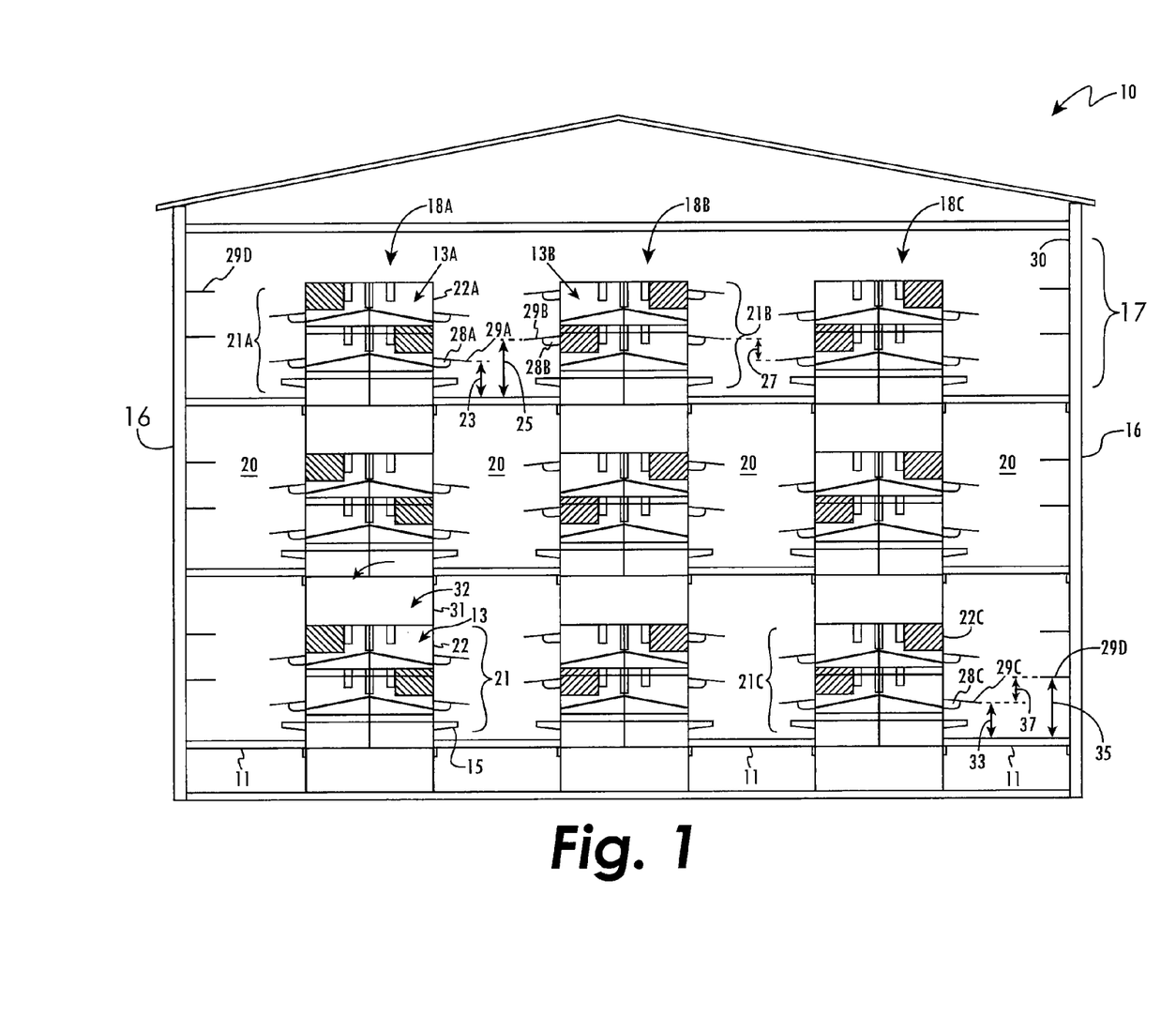
FIG. 1 is a front view of an aviary formed in accordance with an embodiment.

FIG. 1 illustrates an aviary 10 having a floor 14 enclosed by exterior walls 16. The exterior walls 16 define an interior surface 30. The exterior walls 16 enclose cage towers 18 where hens may be caged. Although the present embodiment illustrates three cage towers 18, it should be noted that the aviary 10 may be constructed with any number of cage towers 18, including a single cage tower 18. An aisle 20 extends between each cage tower 18 to provide an inspection area and space in which the birds housed in the aviary 10 may move. In an embodiment having a single cage tower 18, an aisle 20 is present on at least one side of the cage tower 18. An aisle 20 is likewise positioned between an end tower 18 and the respective exterior wall 16. At least one scratching floor 11 extends between each at least one cage tower 18. At least one scratching floor 11 is likewise positioned between an end cage tower 18 and the respective exterior wall 16.

Each at least one cage tower 18 includes at least one aviary cage 21. Each at least one aviary cage 21 includes a first outside surface 22 enclosing an inside area 13. Each at least one cage tower 18 includes an outside surface 31 enclosing an inside area 32. At least one bump rail 15 extends from the outside surface 31 and into the aisle 20 to allow equipment to be maneuvered through the aisle 20 without damaging the at least one cage tower 18 or the at least one aviary cage 21. The bump rail 15 may be used by the birds as a perch.

In an embodiment, a first cage tower 18A includes a first aviary cage 21A, and a second cage tower 18B includes a second aviary cage 21B, which second aviary cage 21B is similar to the first aviary cage 21A. Multiple first aviary cages 21A are stacked on top of one another. Each first aviary cage 21A includes a first outside surface 22A enclosing an inside area 13A. Additionally, multiple second aviary cages 21B are stacked on top of one another. Each second aviary cage 21B includes a second outside surface 22B enclosing an inside area 13B. The second aviary cage 21B is positioned adjacent the first aviary cage 21A and an aisle 20 is formed therebetween. A scratching floor 11 extends between the first aviary cage 21A and the second aviary cage 21B. In an embodiment, the scratching floor 11 is configured so that a worker can walk across the scratching floor 11 between the cage towers 18. In an embodiment, the scratching floor 11 is configured so that a worker can walk between a cage tower 18 and a respective exterior wall 16. The scratching floor 11 serves as a scratching area where hens can move freely, peck the floor with their beaks, and scratch the scratching floor 11 with their feet.

The first outside surface 22 of the at least one aviary cage 21 includes a first perch 29 extending into the aisle 20. In an embodiment, each perch 29 may extend a portion of the length of the at least one cage tower 18. In an embodiment, each perch 29 may extend the entire length of the at least one cage tower 18. In an embodiment, the interior surface 30 of the exterior wall 16 includes a second perch 29D extending into the aisle 20. In an embodiment, each perch 29D may extend a portion of the length of the interior surface 30 of the exterior wall 16 of the aviary 10. In an embodiment, each perch 29D may extend substantially the entire length of the interior surface 30 of the exterior wall 16.

In some embodiments, the perch 29 is solid. In one embodiment, the perch 29 may be square. In one embodiment, the perch 29 may be round. In one embodiment, a square perch 29 may have a width of ¾ inches to 2 inches. In one embodiment, a round perch 29 may have a diameter of ¾ inches to 2 inches. The width or diameter of the perch 29 is configured to allow a hen to stand on the perch 29.

Referring to an embodiment, a first perch 29A extends from the first outside surface 22A and is positioned above a first egg conveyor 28A that extends from the first outside surface 22A and that extends along the sides of the first aviary cage 21A. When the hens lay their eggs, the eggs may be collected in the first egg conveyor 28A. The first egg conveyor 28A carries the eggs from the aviary cage 21A to a collection area. The first perch 29A extends into the aisle 20 at a first vertical distance 23 from the scratching floor 11. A second perch 29B extends from the second outside surface 22B and is positioned above a second egg conveyor 28B that extends from the second outside surface 22B and that extends along the sides of the second aviary cage 21B. The second egg conveyor 28B carries the eggs from the aviary cage 21B to a collection area. The second perch 29B extends into the aisle 20 at a second vertical distance 25 from the scratching floor 11. The first vertical distance 23 is not equal to the second vertical distance 25.

In an embodiment, each of the perches 29A and 29B may extend a portion of the length of the respective cage tower 18A and 18B. In an embodiment, each of the perches 29A and 29B may extend the entire length of the respective cage tower 18A and 18B. In some embodiments, the perches 29A and 29B are solid. In one embodiment, the perches 29A and 29B may be square. In one embodiment, the perches 29A and 29B may be round. In one embodiment, the perches 29A and 29B may be square or round. The width or diameter of the perches 29A and 29B is configured to allow a hen to stand on the perches 29A and 29B.

In an embodiment, the first vertical distance 23 and the second vertical distance 25 define a third vertical distance 27. The third vertical distance 27 is configured to permit a bird to hop from the first perch 29A to the second perch 29B or vice versa.

In an embodiment, the first aviary cage 21A may include multiple first egg conveyors 28A, and the second aviary cage 21B may include multiple second egg conveyors 28B, wherein the first egg conveyors 28A and the second egg conveyors 28B are staggered vertically relative to each other along the first and second outside surfaces 31A, 31B of the cage towers 18A and 18B. In an embodiment, the first aviary cage 21A may include multiple first perches 29A, and the second aviary cage 21B may include multiple second perches 29B, wherein the first perches 29A and the second perches 29B are staggered vertically relative to each other along the first and second outside surfaces 22A, 22B of the aviary cages 21A and 21B.

By permitting space for the hens to move freely, the aviary 10 satisfies the requirements for the birds and their eggs to be considered cage free. See http://en.wikipedia.org/wiki/Cage-free. The hens are not continuously confined to an aviary cage. The present embodiments allow the production of eggs that may be sold under the label "cage free" because they were laid outside of a conventional cage environment. In the illustrated embodiments, the scratching floors 11 form three identical levels 17 to the aviary 10, wherein each level 17 may be accessed by a worker.

A hen may walk, peck, scratch, socialize, sleep, and lay eggs, as the bird desires in the inside area 13 and the inside area 32. These same daily activities can be carried out on the at least one scratching floor 11. The at least one aviary cage 21 may house a specific group of birds or it may be open to birds from other aviary cages 21. In an embodiment, the cage tower 18 may be configured to allow the birds to move freely up and down the cage tower 18. In an embodiment, the cage tower 18 may be configured to keep birds in the aviary segregated by vertical level. When the hens lay their eggs, the eggs may be collected in egg conveyors 28 that extend along the sides of the aviary cage 21. The egg conveyors 28 carry the eggs from the aviary cage 21 to a collection area.

Each perch 29 and each bump rail 15 provide yet other areas for the hens to utilize when they are not confined to the at least one aviary cage 21. In particular, hens may sit, hop, walk, scratch, socialize, sleep, and lay eggs from or on any perch 29 and/or any bump rail 15.

When a first perch 29A and a second perch 29B are included in an embodiment, the first vertical distance 23 and the second vertical distance 25 define a third vertical distance 27, which third vertical distance is configured to facilitate the behavior of birds to hop from one surface to another and thereby create a ladder effect between the outside surfaces 22A, 22B of the aviary cages 21A and 21B and, concomitantly, the outside surfaces 31A and 31B of the cage towers 18A and 18B.

In one embodiment, an angle formed between the first perch 29A and the second perch 29B is no greater than 45°, which facilitates the behavior of birds to hop from one surface to another. In one embodiment, a plurality of first and second perches 29A and 29B are spaced apart about the outside surfaces 31A and 31B of the respective cage towers 18A and 18B. In an embodiment, each perch 29A and 29B extends into the aisle 20 to provide usable vertical space that creates additional habitable cubic inches for the birds, thereby enabling the aviary 10 to be considered cage free. In an embodiment, the first aviary cage 21A may include multiple first perches 29A, corresponding to the number of first egg conveyors 28A, and the second aviary cage 21B may include multiple second perches 29B, corresponding to the number of second egg conveyors 28B, wherein the first perches 29A and the second perches 29B are staggered in relation to each other along the first and second outside surfaces 31A, 31B of the cage towers 18A and 18B. In one embodiment, the first perches 29A and the second perches 29B are staggered vertically on the first and second outside surfaces 31A, 31B of the cage towers 18A and 18B. In one embodiment, the first perches 29A and the second perches 29B are staggered horizontally along the first and second outside surfaces 31A, 31B of the cage towers 18A and 18B.

In the illustrated embodiment, a cage tower 18C is positioned adjacent the exterior wall 16 and includes an aviary cage 21C adjacent the scratching floor 11. An egg conveyor 28C extends from an outside surface 22C of the aviary cage 21C and into the aisle 20. A perch 29C extends from the outside surface 22C of the aviary cage 21C and is positioned above the egg conveyor 28C. A perch 29D extends from the interior surface 30 of the exterior wall 16 and into the aisle 20.

In an embodiment, the perch 29C is elevated at a first vertical distance 33 from the scratching floor 11, and the perch 29D is positioned at a second vertical distance 35 from the scratching floor 11. In an embodiment, the first vertical distance 33 and the second vertical distance 35 define a third vertical distance 37, which third vertical distance 37 is configured to facilitate the behavior of birds to hop from one surface to another and thereby create a ladder effect between the aviary cage 21C and the exterior wall 16. In one embodiment, an angle formed between the perch 29C and the perch 29D is no greater than 45°, which configuration facilitates the behavior of birds to hop from one surface to another. In one embodiment, a plurality of perches 29C and 29D are spaced apart about the outside surface 31C of the cage tower 18C and on the interior surface 30 of the exterior wall 16. Each perch 29C and 29D extends into the aisle 20 to provide usable vertical space that creates additional habitable cubic inches for the birds, thereby enabling the aviary 10 to be considered cage free.

Figure 2:
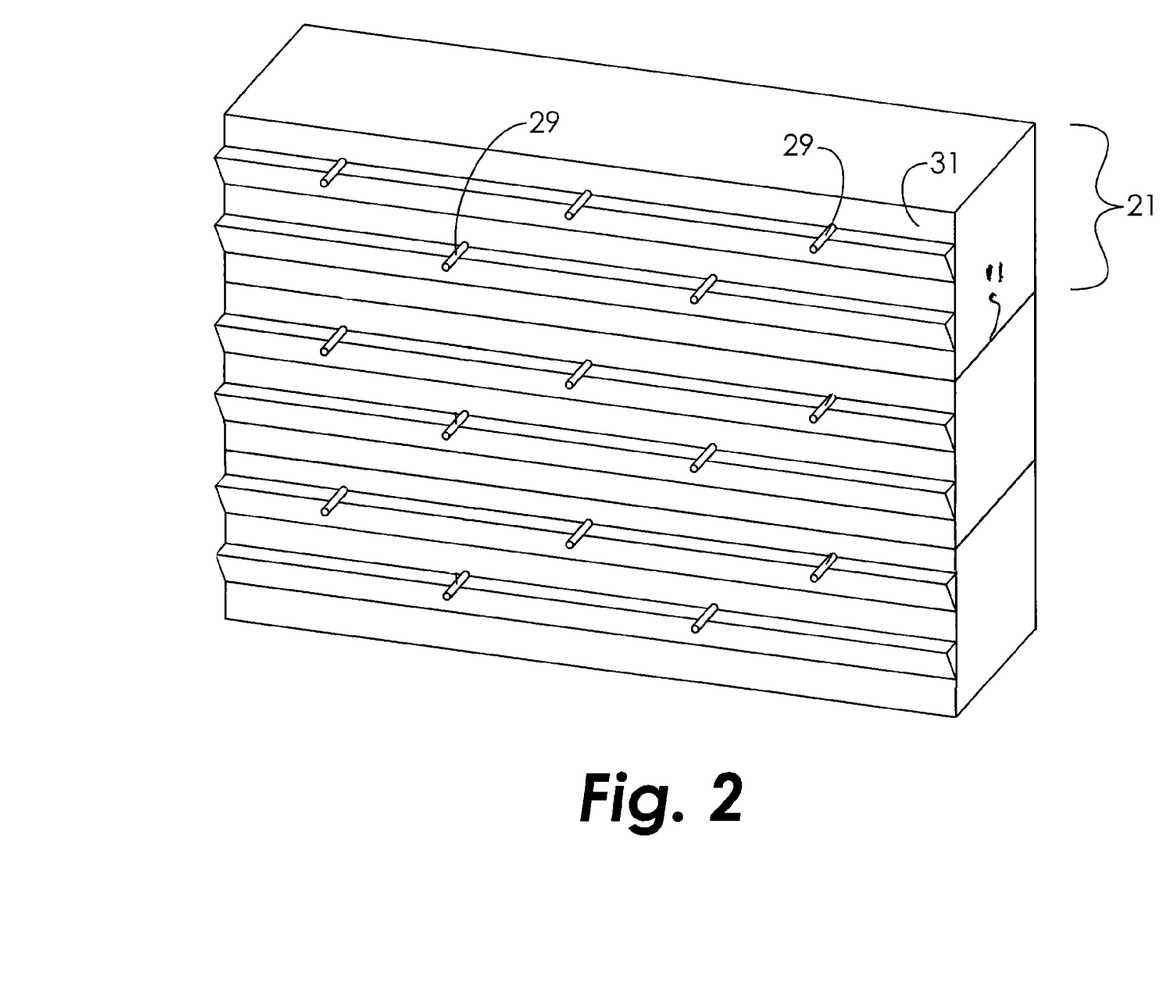
FIG. 2 illustrates a side view of a cage tower formed in accordance with an embodiment.

As illustrated in FIG. 2, each of the perches 29 may be offset horizontally with respect to one another. The perches 29 are offset in a spaced apart arrangement to accommodate the behavior of birds to hop from one surface to another and thereby create a ladder effect on the outside surface 22 of the aviary cage 21 and, concomitantly, the outside surface 31 of the cage tower 18. In an embodiment, the perches 29 are sloped downward from the cage tower 18. In an embodiment, the perches 29 extend from the outside surface 22 parallel to the scratching floor 11. In an embodiment, the perches 29 may extend upward from the outside surface 22 relative to the cage tower 18.

Figure 3:
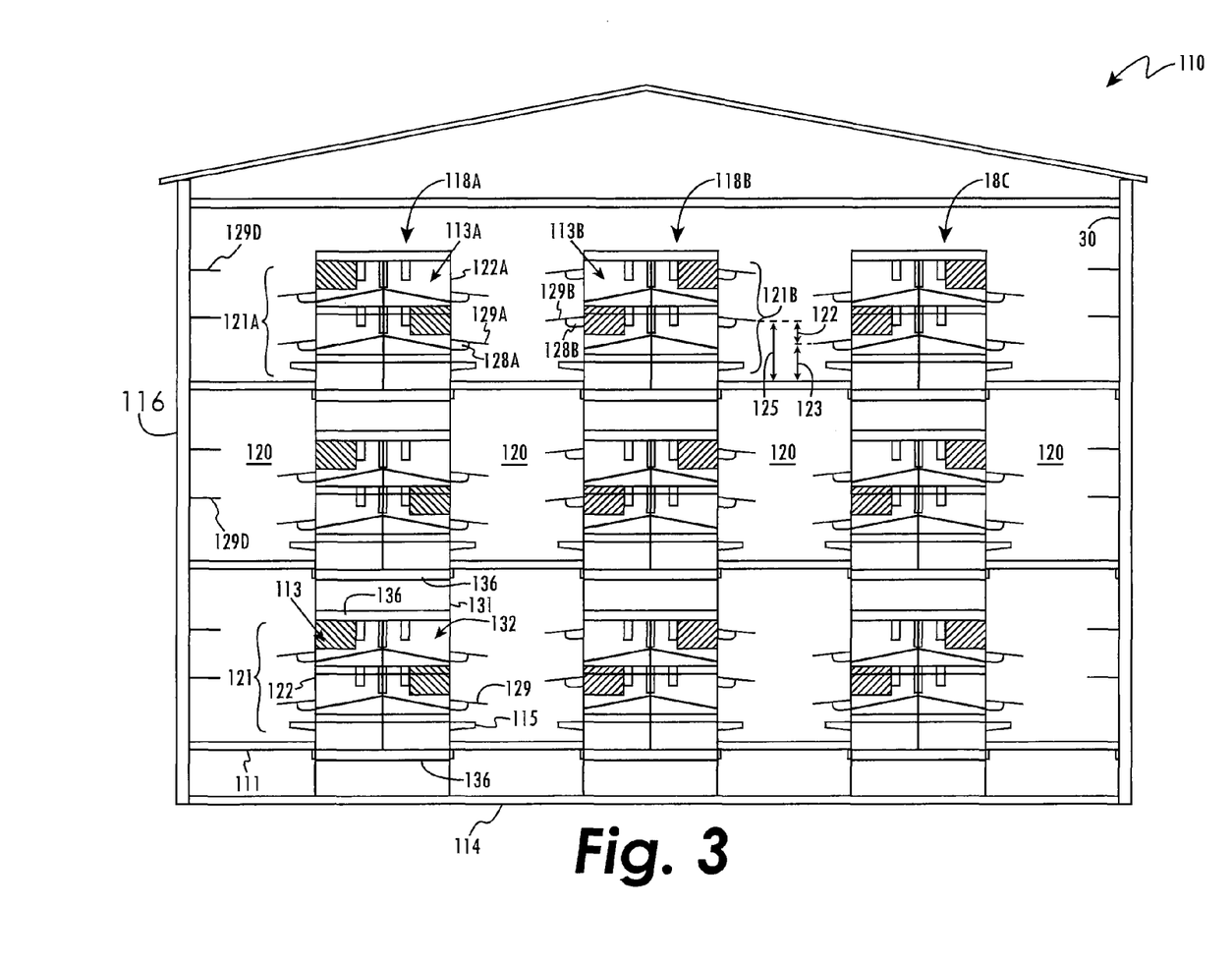
FIG. 3 is a front view of an aviary formed in accordance with an embodiment.
Figure 4:
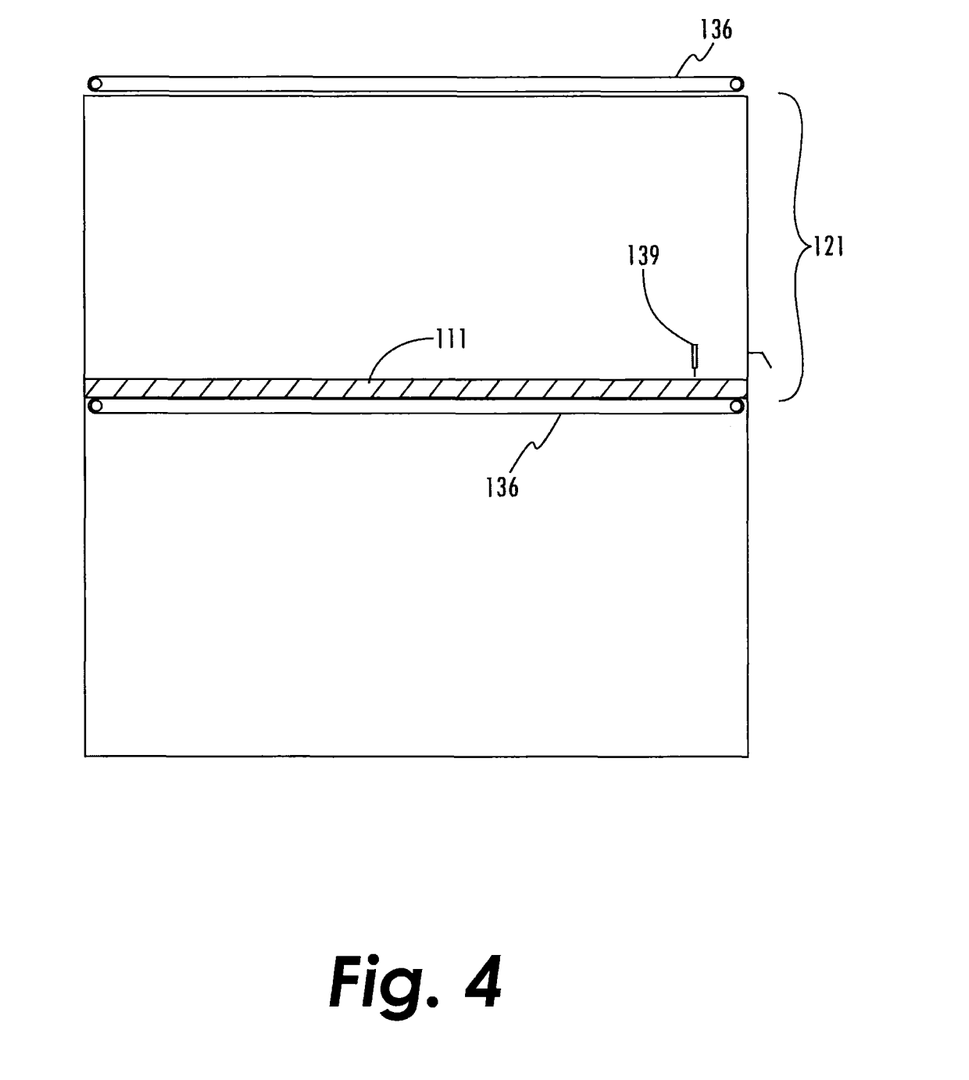
FIG. 4 is a side view of a cage of the second cage tower shown in FIG. 3.

FIGS. 3 and 4 illustrate an aviary 110 having a floor 114 enclosed by exterior walls 116. The exterior walls 116 define an interior surface 130. The exterior walls 116 enclose cage towers 118 where hens may be caged. Although the present embodiment illustrates three cage towers 118, it should be noted that the aviary 110 may be constructed with any number of cage towers 118, including a single cage tower 118. An aisle 120 extends between each cage tower 118 to provide an inspection area and space in which the birds housed in the aviary 110 may move. In an embodiment having a single cage tower 118, an aisle 120 is present on at least one side of the cage tower 118. An aisle 120 is likewise positioned between an end tower 118 and the respective exterior wall 116. At least one scratching floor 111 extends between each at least one cage tower 118. At least one scratching floor 111 is likewise positioned between an end cage tower 118 and the respective exterior wall 116.

Each at least one cage tower 118 includes at least one aviary cage 121. Each at least one aviary cage 121 includes a first outside surface 122 enclosing an inside area 113. Each at least one cage tower 118 includes an outside surface 131 enclosing an inside area 132. At least one bump rail 115 extends from the outside surface 131 and into the aisle 120 to allow equipment to be maneuvered through the aisle 120 without damaging the at least one cage tower 118 or the at least one aviary cage 121. The bump rail 115 may be used by the birds as a perch.

In an embodiment, a first cage tower 118A includes a first aviary cage 121A, and a second cage tower 118B includes a second aviary cage 121B, which second aviary cage 121B is similar to the first aviary cage 121A. Multiple first aviary cages 121A are stacked on top of one another. Each first aviary cage 121A includes a first outside surface 122A enclosing an inside area 113A. Additionally, multiple second aviary cages 121B are stacked on top of one another. Each second aviary cage 121B includes a second outside surface 122B enclosing an inside area 113B. The second aviary cage 121B is positioned adjacent the first aviary cage 121A and an aisle 120 is formed therebetween. A scratching floor 111 extends between the first aviary cage 121A and the second aviary cage 121B. In an embodiment, the scratching floor 111 is configured so that a worker can walk across the scratching floor 111 between the cage towers 118. In an embodiment, the scratching floor 111 is configured so that a worker can walk between a cage tower 118 and a respective exterior wall 116. The scratching floor 111 serves as a scratching area where hens can move freely, peck the floor with their beaks, and scratch the scratching floor 111 with their feet.

The first outside surface 122 of the at least one aviary cage 121 includes a first perch 129 extending into the aisle 120. In an embodiment, each perch 129 may extend a portion of the length of the at least one cage tower 118. In an embodiment, each perch 129 may extend the entire length of the at least one cage tower 118. In an embodiment, the interior surface 130 of the exterior wall 116 includes a second perch 129D extending into the aisle 120. In an embodiment, each perch 129D may extend a portion of the length of the interior surface 130 of the exterior wall 116 of the aviary 110. In an embodiment, each perch 129D may extend substantially the entire length of the interior surface 130 of the exterior wall 116.

In some embodiments, the perch 129 is solid. In one embodiment, the perch 129 may be square. In one embodiment, the perch 129 may be round. In one embodiment, a square perch 129 may have a width of ¾ inches to 2 inches. In one embodiment, a round perch 129 may have a diameter of ¾ inches to 2 inches. The width or diameter of the perch 129 is configured to allow a hen to stand on the perch 129.

Referring to an embodiment, a first perch 129A extends from the first outside surface 122A of the first aviary cage 121A and is positioned above a first egg conveyor 128A that extends from the first outside surface 122A and that extends along the sides of the first aviary cage 121A. When the hens lay their eggs, the eggs may be collected in the first egg conveyor 128A. The first egg conveyor 128A carries the eggs from the aviary cage 121A to a collection area. The first perch 129A extends into the aisle 120 at a first vertical distance 123 from the scratching floor 111. A second perch 129B extends from the second outside surface 122B of the second aviary cage 121B and is positioned above a second egg conveyor 128B that extends from the second outside surface 122B and that extends along the sides of the second aviary cage 121B. The second egg conveyor 128B carries the eggs from the aviary cage 121B to a collection area. The second perch 129B extends into the aisle 120 at a second vertical distance 125 from the scratching floor 111. The first vertical distance 123 is not equal to the second vertical distance 125.

In an embodiment, each of the perches 129A and 129B may extend a portion of the length of the respective cage tower 118A and 118B. In an embodiment, each of the perches 129A and 129B may extend the entire length of the respective cage tower 118A and 118B. In some embodiments, the perches 129A and 129B are solid. In one embodiment, the perches 129A and 129B may be square. In one embodiment, the perches 129A and 129B may be round. In one embodiment, the perches 129A and 129B may be square or round. The width or diameter of the perches 129A and 129B is configured to allow a hen to stand on the perches 129A and 129B.

In an embodiment, the first vertical distance 123 and the second vertical distance 125 define a third vertical distance 127. The third vertical distance 127 is configured to permit a bird to hop from the first perch 129A to the second perch 129B or vice versa.

In an embodiment, the first aviary cage 121A may include multiple first egg conveyors 128A, and the second aviary cage 121B may include multiple second egg conveyors 128B, wherein the first egg conveyors 128A and the second egg conveyors 128B are staggered vertically relative to each other along the first and second outside surfaces 131A, 131B of the cage towers 118A and 118B. In an embodiment, the first aviary cage 121A may include multiple first perches 129A, and the second aviary cage 121B may include multiple second perches 129B, wherein the first perches 129A and the second perches 129B are staggered vertically relative to each other along the first and second outside surfaces 122A, 122B of the aviary cages 121A and 121B.

Each perch 129 and each bump rail 115 provide yet other areas for the hens to utilize when they are not confined to the at least one aviary cage 121. In particular, hens may sit, hop, walk, scratch, socialize, sleep, and lay eggs from or on any perch 129 and/or any bump rail 115.

When a first perch 129A and a second perch 129B are included in an embodiment, the first vertical distance 123 and the second vertical distance 125 define a third vertical distance 127, which third vertical distance is configured to facilitate the behavior of birds to hop from one surface to another and thereby create a ladder effect between the outside surfaces 122A, 122B of the aviary cages 121A and 121B and, concomitantly, the outside surfaces 131A and 131B of the cage towers 118A and 118B.

In one embodiment, an angle formed between the first perch 129A and the second perch 129B is no greater than 45°, which facilitates the behavior of birds to hop from one surface to another. In one embodiment, a plurality of first and second perches 129A and 129B are spaced apart about the outside surfaces 131A and 131B of the respective cage towers 118A and 118B. In an embodiment, each perch 129A and 129B extends into the aisle 120 to provide usable vertical space that creates additional habitable cubic inches for the birds, thereby enabling the aviary 110 to be considered cage free. In an embodiment, the first aviary cage 121A may include multiple first perches 129A, corresponding to the number of first egg conveyors 128A, and the second aviary cage 121B may include multiple second perches 129B, corresponding to the number of second egg conveyors 128B, wherein the first perches 129A and the second perches 129B are staggered vertically along the first and second outside surfaces 131A, 131B of the cage towers 118A and 118B.

At least one belt 136 extends through each aviary cage 121 to remove a deposit from at least part of the aviary cage 121. A deposit may include, but is not limited to, one or more items such as manure, an egg, litter, feathers, feed, or a dead bird. In one embodiment, the belt 136 extends through each aviary cage 121 along the length of the cage tower 118. In one embodiment, the belt 136 extends approximately 400 feet along the length of each cage tower 118. In one embodiment, the belt 136 carries deposits from the aviary cage 121 to a collection area (not shown) positioned outside of the aviary cage 121.

A scratching floor 111 extends between the first aviary cage 121A and the second aviary cage 121B. The scratching floor 111 is oriented with respect to and positioned adjacent to a respective belt 136. In one embodiment, the scratching floor 111 is planar with the respective belt 136 from which the scratching floor 111 extends. Alternatively, the scratching floor 111 is sloped to allow deposits to move back toward the respective belt 136. When the birds scratch the scratching floor 111, they scratch much of the deposits made on the scratching floor 111 onto the belt 136. Accordingly, since it is common for birds to defecate in their scratching area, the scratching floor 111 becomes relatively self-cleaning as the hens scratch. The scratching floor 111 is configured so that the deposits are scratched back to the respective belt 136. Such configuration reduces the required frequency for cleaning of the aviary 110. Any eggs laid on the scratching floor 111 may be directed back toward the belt 136 by the scratching of the hens. These eggs are then collected from the belt 136 and removed from the belt 136.

In one embodiment, the belt 136 forms a floor of each aviary cage 121. Accordingly, the birds are allowed to move freely and walk on the belt 136.

By removing deposits, particularly manure, from at least part of each aviary cage 121, ammonia levels within the aviary 110 are significantly reduced. Additionally, the need for an individual to enter the aviary 110 and clean the aviary 110 by hand is greatly reduced. Accordingly, the present embodiments permit one person to care for 150,000 to 200,000 birds, compared with the 3-5 people per 150,000 to 200,000 birds required when known cages and aviaries are used. The present embodiments also minimize or eliminate the requirement for extreme body positions, including squatting for extended periods of time and crawling and lying on the floor while loading and unloading the cage and while gathering eggs from the cage. The present embodiments further reduce potential respiratory hazards and infection hazards to the workers. If a hen lays an egg within the inside area 113, the egg will be collected by the belt 136 and carried to an egg collection area (not shown) positioned outside of the aviary cage 121.

Figures 5A, 5B:
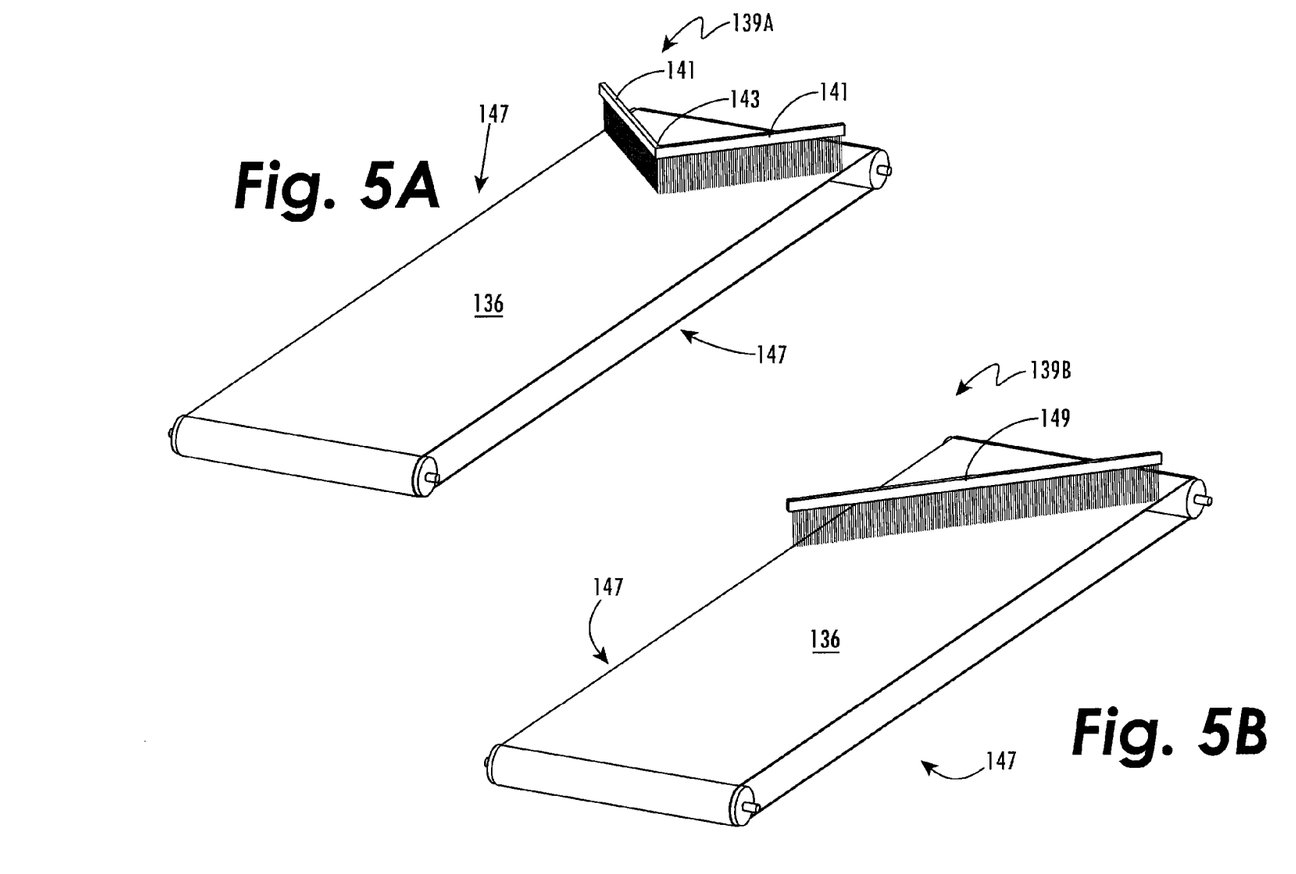
FIG. 5A is a perspective top view of an egg collector belt formed in accordance with an embodiment.
FIG. 5B is a perspective top view of an egg collector belt formed in accordance with another embodiment.

In one embodiment, the eggs are removed from the belt 136 through the use of an egg remover 139 positioned at the end of the belt 136. FIG. 5A shows one embodiment of an egg remover 139A. In the illustrated embodiment, the egg remover 139A includes two brushes 141 that meet at a point 143. From the point 143, each brush 141 extends toward a side 147 of the belt 136. In particular, each brush 141 extends at an angle toward a side 147 of the belt 136 in the direction of movement of the belt 136, wherein the brushes 141 extend over the full width of the belt 136. The brushes 141 rotate in a direction that moves material to at least one side 147 of the belt 136. In one embodiment, the brush 141 may be an auger-shaped brush. Additionally, in one embodiment, a finger belt (not shown) is utilized to move the eggs to a side 147 of the belt 136. In yet another embodiment, any egg conveying apparatus, including but not limited to a roller having a flange, can be utilized to move the eggs to a side 147 or both sides 147 of the belt 136.

FIG. 5B shows another embodiment of an egg remover 139B. The egg remover 139B includes a single brush 149 that extends the width of the belt 136 at an angle from one side 147 of the belt 136 to the other side 147 of the belt 136. The brush 149 rotates in a direction that moves material to the downstream end of the brush 149 with respect to the direction of movement of the belt 136.

Each brush 141, 149 is formed from a material having a rigidity that enables the brush 141, 149 to move eggs toward at least one side 147 of the belt 136. However, the rigidity is such that the brush 141, 149 is incapable of moving deceased birds. Rather, deceased birds pass through and/or under the brush 141, 149 and are deposited at an end of the belt 136. Additionally, the brush 141, 149 is positioned above the belt 136 to enable deposits other than eggs to pass under the brush 141, 149.

Figures 6, 7:
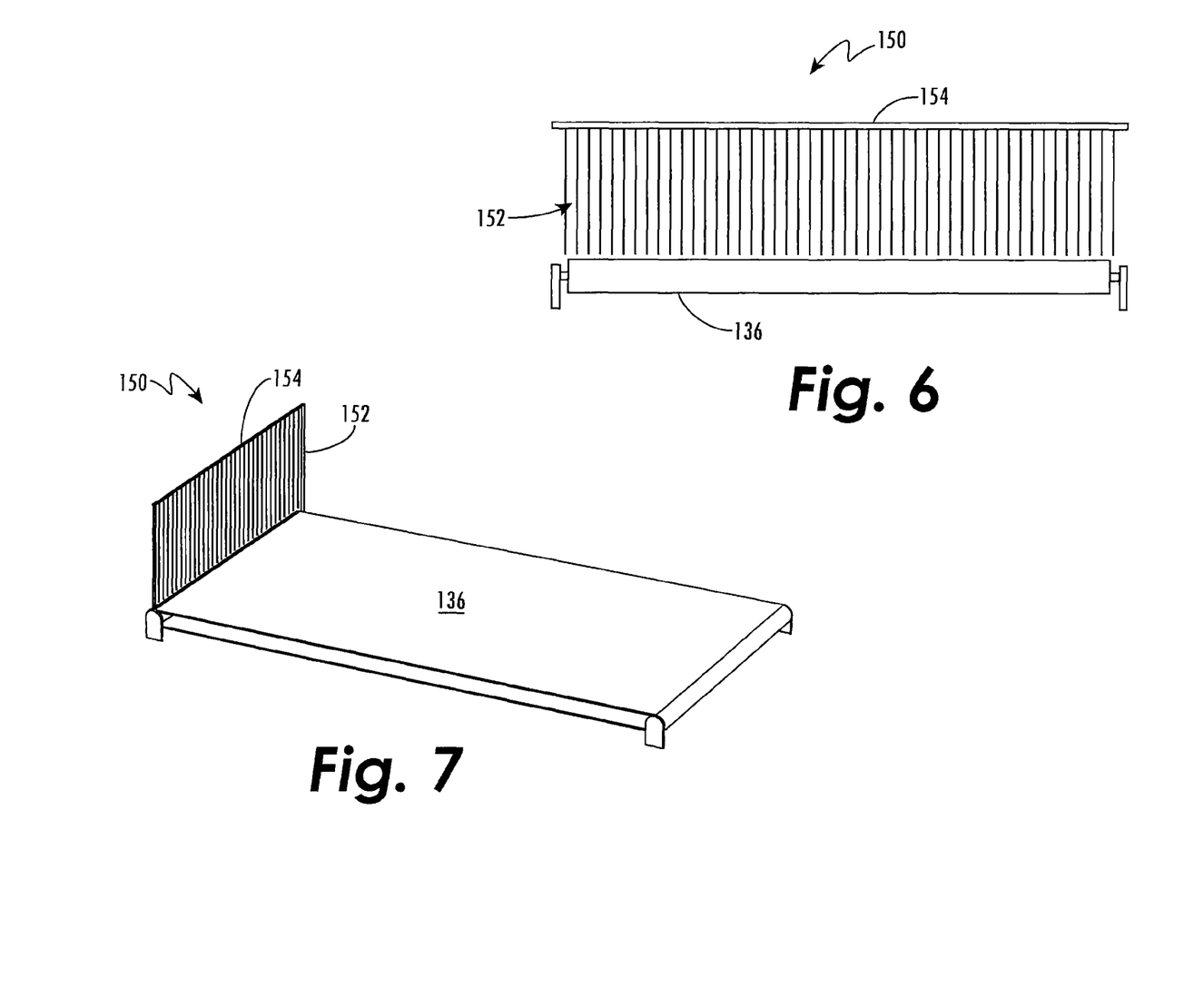
FIG. 6 is a front view of a gate formed in accordance with an embodiment.
FIG. 7 is a side perspective view of the gate shown in FIG. 6.

In one embodiment, illustrated in FIGS. 6 and 7, at least one gate 150 is positioned along at least one belt 136 to permit deposits on the belt 136 to pass thereunder and/or therethrough and to prevent birds from traveling beyond the gate. In one embodiment, the gate 150 includes openings 152 operative to enable deposits to pass therethrough. Additionally, in one embodiment, the gate 150 includes a hinge 154 operative to rotate the gate 150 and thereby enable larger deposits, such as eggs and dead animals, to move past the gate 150. In an embodiment, an electric fence may be positioned on the gate 150 to prevent live birds from entering the gate 150. In an embodiment, an electric fence may be spaced apart from the gate 150 to prevent birds from reaching and entering the gate 150. In embodiments including at least one gate 150, birds are prevented from leaving a part of the aviary 110 while deposits are permitted to travel away from that part of the aviary 110.

The present embodiments allow the removal of freshly laid eggs from the aviary 10, 110, which eggs may be sold under the label "cage free" because they were laid outside of a nest box environment. The present embodiments also prevent eggs from becoming contaminated due to slow retrieval thereof from the scratching areas or cage floor (during which time the eggs could be infiltrated by bacteria). Some embodiments permit automated removal of deceased birds.

Figure 8:
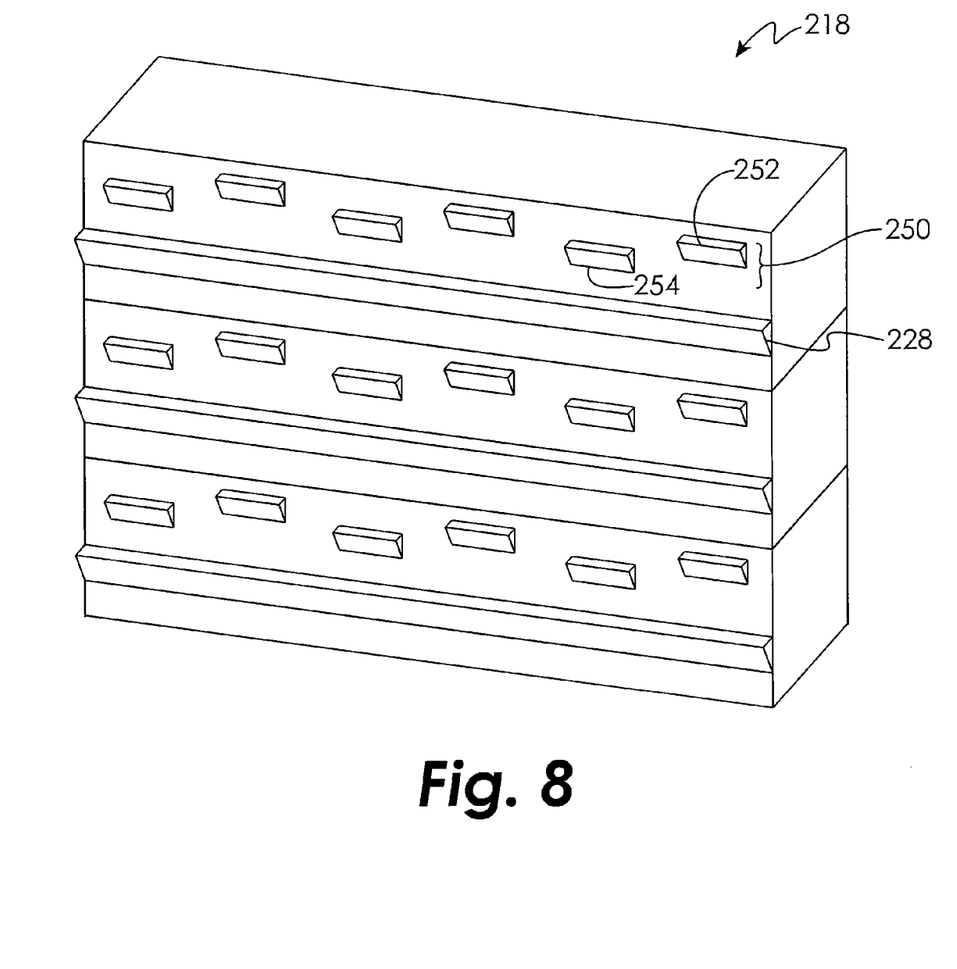
FIG. 8 illustrates a side view of a cage tower formed in accordance with an embodiment.

In one embodiment shown in FIG. 8, a plurality of perches 250 are spaced apart about an outside of a cage tower 218. First perches 252 and second perches 254 may be offset horizontally with respect to one another. In an embodiment, the first perches 252 and the second perches 254 may be offset vertically with respect to one another. The perches 250, if they are offset from each other, may be offset by a hopping distance for a bird. The perches 250 may be positioned above and below the egg conveyors 228. Each perch 250 extends into an aisle formed between adjacent cage towers 218 or into an aisle formed between a cage tower 218 and an exterior wall 216. The usable vertical space created by the perches 250 provides additional habitable cubic inches for the birds.

In one embodiment, a method of constructing an aviary 10 is provided. The method includes positioning a first aviary cage 21A adjacent to a second aviary cage 21B. Each first aviary cage 21A includes a first outside surface 22A enclosing an inside area 13A. Each second aviary cage 21B includes a second outside surface 22B enclosing an inside area 13B. An aisle 20 is extended between the first aviary cage 21A and the second aviary cage 21B. A first perch 29A is extended from the first outside surface 22A of the first aviary cage 21A and into the aisle 20 at a first vertical distance 23 from a scratching floor 11. A second perch 29B is extended from the second outside surface 22B of the second aviary cage 21B and into the aisle 20 at a second vertical distance 25 from the scratching floor 11. In an embodiment, the first vertical distance 23 and the second vertical distance 25 define a third vertical distance 27 in a spaced apart arrangement to accommodate the behavior of birds to hop from one surface to another and thereby create a ladder effect between the outside surfaces 22A, 22B of the aviary cages 21A and 21B.

Each of the first aviary cage 21A and the second aviary cage 21B may include at least one belt 136 positioned within the inside area 13A, 13B. The method further includes positioning the first perch 29A and the second perch 29B adjacent the respective belt 136. In one embodiment, the respective belt 136 forms at least one floor of each aviary cage 21A, 21B. The at least one belt 136 is configured to remove a deposit from at least part of the respective aviary cage 21A, 21B. An egg remover 139 may be positioned at an end of each belt 136 to remove eggs from the belt 136.

In an embodiment, a gate 150 is positioned in relation to each belt 136 to prevent animals from leaving the respective aviary cage 21A, 21B. The gate 150 may include openings 152 to enable debris to pass therethrough. Additionally, the gate 150 may include a hinge 154 to rotate the gate 150 and thereby enable eggs and dead animals to move past the gate 150.

The systems and methods according to the present disclosure can be further modified within the scope and spirit of this disclosure. This application is therefore intended to cover any variations, uses, or adaptations of the disclosure using its general principles. For example, the methods disclosed herein and in the appended claims represent one possible sequence of performing the steps thereof. A practitioner may determine in a particular implementation that a plurality of steps of one or more of the disclosed methods may be combinable, or that a different sequence of steps may be employed to accomplish the same results. Each such implementation falls within the scope of the present disclosure as disclosed herein and in the appended claims. Furthermore, this application is intended to cover such departures from the present disclosure as come within known or customary practice in the art to which this disclosure pertains and which fall within the limits of the appended claims.

What is claimed is:

1. An aviary comprising:
a floor;
a first aviary cage including a first outside surface;

a second aviary cage including a second outside surface and positioned adjacent the first aviary cage;
an aisle extending between the first aviary cage and the second aviary cage;
a first perch extending from the first outside surface of the first aviary cage and into the aisle at a first vertical distance from the floor; and
a second perch extending from the second outside surface of the second aviary cage and into the aisle at a second vertical distance from the floor, wherein the first and second vertical distances from the floor are not equal.

2. The aviary of claim 1 further comprising a plurality of first perches and a plurality of second perches, the plurality of first perches being horizontally offset from one another, the plurality of second perches being horizontally offset from one another.

3. The aviary of claim 1 further comprising a plurality of first perches and a plurality of second perches, the plurality of first perches being vertically offset from one another, the plurality of second perches being vertically offset from one another.

4. The aviary of claim 1, wherein the first vertical distance and the second vertical distance define a third vertical distance that enables an animal to hop between the first perch and the second perch.

5. The aviary of claim 1, wherein each of the first aviary cage and the second aviary cage further comprises:
a belt; and
an egg conveyor.

6. The aviary of claim 5 further comprising:
a scratching floor extending between the first aviary cage and the second aviary cage and positioned adjacent the belt of each of the first aviary cage and the second aviary cage; and
wherein each of the first perch and the second perch extend from the respective first and second outside surfaces above a respective egg conveyor.

7. The aviary of claim 5, wherein said belt forms at least one floor of the respective aviary cage.

8. The aviary of claim 6, wherein said belt is operative to remove a deposit from at least part of the respective aviary cage.

9. The aviary of claim 7 further comprising an egg remover having at least one brush to direct eggs on the belt toward at least one side of the belt.

10. The aviary of claim 9 further comprising a gate positioned in relation to the belt to prevent animals from leaving the respective aviary cage.

11. The aviary cage of claim 10, wherein each gate further comprises openings operative to enable debris to pass therethrough.

12. The aviary cage of claim 10, wherein each gate comprises a hinge operative to rotate the gate to enable eggs and dead animals to move past the gate.

13. An aviary comprising:
a floor;
a first aviary cage including a first outside surface;
a second aviary cage including a second outside surface, the second aviary cage positioned adjacent the first aviary cage;
an aisle extending between the first aviary cage and the second aviary cage;
a first perch extending from the first outside surface of the first aviary cage and into the aisle at a first vertical distance from the floor; and
a second perch extending from the second outside surface of the second aviary cage and into the aisle at a second vertical distance from the floor, wherein the first and second vertical distances from the floor are not equal and define a third vertical distance that enables an animal to hop between the first perch and the second perch.

14. The aviary of claim 13 further comprising a plurality of first perches and a plurality of second perches, the plurality of first perches being horizontally offset from one another, the plurality of second perches being horizontally offset from one another.

15. The aviary of claim 13 further comprising a plurality of first perches and a plurality of second perches, the plurality of first perches being vertically offset from one another, the plurality of second perches being vertically offset from the plurality of first perches.

16. The aviary of claim 13, wherein each of the first aviary cage and the second aviary cage further comprises:
a belt; and
an egg conveyor.

17. The aviary of claim 16, further comprising:
a scratching floor extending between the first aviary cage and the second aviary cage and positioned adjacent the belt of each of the first aviary cage and the second aviary cage; and
wherein each of the first perch and the second perch extend from the respective first and second outside surfaces above a respective egg conveyor.

18. The aviary of claim 16, wherein said belt forms a floor of the respective aviary cage and is operative to remove a deposit from at least part of the respective aviary cage.

19. The aviary of claim 18 further comprising an egg remover having at least one brush to direct an egg on the belt toward a side of the belt.

20. The aviary of claim 18 further comprising at least one gate positioned in relation to the belt to prevent animals from leaving the respective aviary cage.

21. The aviary of claim 20, wherein said at least one gate further comprises:
openings operative to enable debris to pass therethrough; and
a hinge operative to rotate the gate to enable eggs and dead animals to move past the gate.

22. A method of constructing an aviary comprises:
positioning a first aviary cage including a first outside surface adjacent to a second aviary cage including a second outside surface, wherein both the first aviary cage and the second aviary cage are positioned over a floor;
extending an aisle between the first aviary cage and the second aviary cage;
extending a first perch from the first outside surface of the first aviary cage and into the aisle at a first vertical distance from the floor;
extending a second perch from the second outside surface of the second aviary cage and into the aisle at a second vertical distance from the floor, wherein the first vertical distance and the second vertical distance are not equal; and
positioning the first and second vertical distances to define a third vertical distance that enables an animal to hop between the first perch and the second perch.

23. The method of claim 22, wherein the aviary includes a plurality of first perches and a plurality of second perches, the method further comprising:
offsetting the plurality of first perches vertically from one another; and
offsetting the plurality of second perches vertically from the plurality of first perches.

24. The method of claim 22, further comprising:
positioning a scratching floor extending between the first aviary cage and the second aviary cage; and
forming a floor of each of the first aviary cage and the second aviary cage with a belt configured to remove a deposit from at least part of the respective aviary cage.

25. The method of claim 24 further comprising positioning an egg remover having at least one brush to direct eggs on the belt toward a side of the belt at an end of the belt.

26. The method of claim 24 further comprising positioning at least one gate in relation to at least one of said belts to prevent animals from leaving the respective aviary cage.

27. The method of claim 26 further comprising:
providing openings in said at least one gate to enable debris to pass therethrough; and
hinging said at least one gate to rotate the gate and enable eggs and dead animals to move past the gate.

28. The method of claim 22 further comprising positioning each of the first perch and the second perch above a respective egg conveyor.

* * * * *